United States Patent Office 2,917,295
Patented Dec. 15, 1959

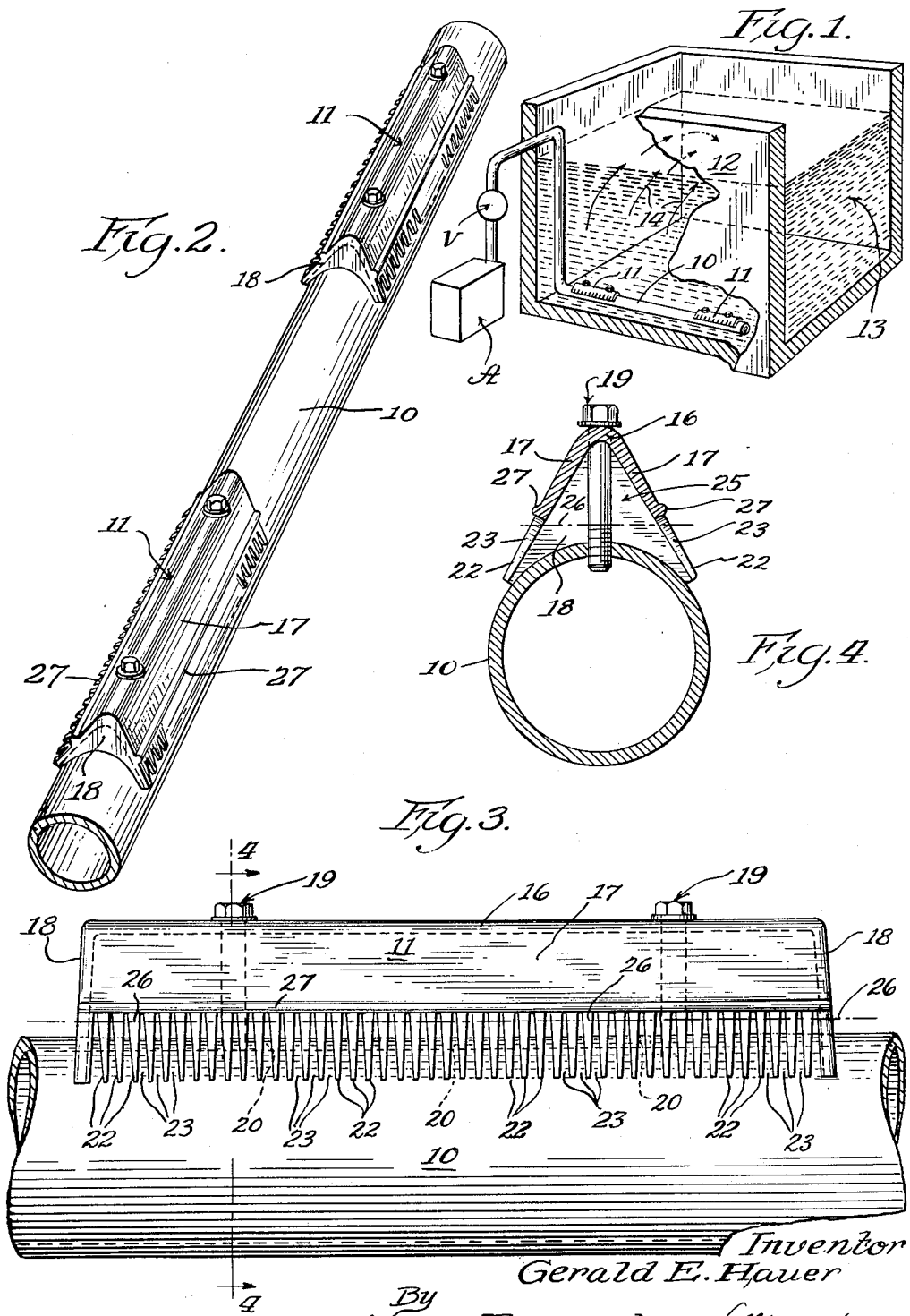

2,917,295
DIFFUSER

Gerald E. Hauer, Aurora, Ill., assignor to The American Well Works, a corporation of Illinois Application August 29, 1956, Serial No. 606,836

3 Claims. (Cl. 261—124)

This invention relates to a diffuser for introducing a gas into a liquid and more particularly is concerned with a device for use in sewage aeration operation such as: pre-areation, grit removal, channel aeration, or the activated sludge process. Another typical application is in the introduction of carbon dioxide into water for the purpose of recarbonation or alkalinity adjustment.

In sewage treatment operations, aeration is most effective both for purposes of oxidation and for setting up circulation of the tank contents when the air is introduced in a continuous pattern of small bubbles. For a given quantity of gas, the smaller the bubbles the larger is the exposed surface area and hence the larger is the gas-liquid interface. Furthermore, a continuous and uniform pattern of bubbles develops a more desirable and uniform recirculation of the tank contents. This recirculation of the tank contents is because of the "air-lift" principle and occurs because the density of the air-liquid mixture set up by the bubbles is somewhat less than the density of the liquid itself with the result that the mixture is displaced upwardly and a circulatory flow is set up.

The aeration art has experienced a great deal of difficulty in developing a satisfactory diffuser and, in the past, a wide variety of diffuser media have been employed. The most recent sewage aeration devices include permeable plates or tubes of ceramic bonded aluminum oxide or plastic cloth, or plastic covered frames of various shapes and sizes adapted to emit a controlled pattern of bubbles. Not only are these arrangements unduly complicated and costly in an attempt to produce a desired bubble pattern, but they also are subject to numerous mechanical failures such as internal orifice clogging, debris accumulation, breakage, etc., and require frequent repair or replacement. The frequency of operational failure of these devices is amply evidenced by the development of the so-called "swing" diffuser which permits the diffuser elements to be removed from the tank for periodic repair or replacement.

The principal object of the present invention is to provide an improved diffuser for introducing a gas into a liquid: that provides a uniform bubble pattern having a large quantity of small size bubbles for maximum mixing efficiency; that utilizes non-clogging, self-cleaning orifices, the effective size of which varies automatically in accordance with the flow rates of the gas passing therethrough such that a minimum and constant friction loss is achieved; that lends itself to a peaked construction for automatically shedding any solid materials or other deposits that may tend to collect on the diffuser; that may be cleaned of rags or other debris by employing high rates of air flow for blowing away such material; that requires no special maintenance such as periodic manual cleaning; and that is of an unbreakable and inexpensive construction.

Briefly, the diffuser of the invention consists of an impermeable dome, the bottom edges of which are provided with a plurality of closely spaced downwardly flaring slots that admit air under pressure for mixing with the tank contents in the form of a controlled pattern of small bubbles. The dome forms a pocket for the air that is supplied to the diffuser and the air pressure is correlated with the hydrostatic pressure existing in the tank at the region of the diffuser. The downwardly flaring slots form variable size orifices that have almost no tendency to collect particles carried by the air passing through their narrow upper ends and any such collection that may occur merely causes the air to bypass these collections and enter the liquid at a slightly lower point. Due to the flaring nature of the orifices, they readily accommodate increased rates of air flow by admitting correspondingly larger size air bubbles. This arrangement has the advantage that greatly increased rate of flow may be employed for forcing large quantities of air through these orifices in order to clean the orifice itself, and even more important, to blow rags and other debris free of the diffuser should they become entangled thereon.

Other objects and advantages of the invention will be apparent during the course of the following description.

In the accompanying drawings forming a part of this specification and in which like numerals are employed to designate like parts throughout the same, Fig. 1 is a fragmentary perspective view in diagrammatic form of an aeration system that includes an air main carrying a plurality of parallel mounted diffusers submerged near the bottom of a tank, the contents of which are to be aerated;

Fig. 2 is an enlarged fragmentary perspective view of the air main and the parallel mounted diffusers;

Fig. 3 is an enlarged side view better illustrating the mounting of the diffusers on the air main; and Fig. 4 is a sectional view taken on the line 4—4 of Fig. 3.

Referring now to the drawings and particularly to Fig. 1, numeral 10 designates an air main or header such as is employed for distributing air from a source of air under pressure A through a pressure regulating valve V, if desired, and a plurality of diffuser tubes 11 which are suitably submerged within a tank 12 for introducing gas bubbles into the tank for the purpose of setting up a desired recirculation of the tank contents 13 as indicated by the arrows 14 and/or for the purpose of oxidizing the contents of the tank. Such arrangements are commonly found in sewage treatment systems wherein they are commonly used for preaeration, grit removal, channel aeration, or the activated sludge process. In the ensuing description reference will be made to such operations though it should be appreciated that the diffuser of the invention has application to a wide variety of systems wherein it is desired to provide an intimate mixing of a gas with a liquid.

When applied to a parallel mounted diffuser arrangement, shown in Figs. 1, 2, 3, and 4, the diffuser of the invention is preferably in the form of an inverted trough that is mounted directly to the air main. The inverted trough may be of any suitable material that is impermeable to the gas being diffused and that is corrosion resistant in the presence of the liquid being aerated. A preferred material for the trough is a molded vinyl resin plastic of the type that is known commercially as "Saran" and that is formed from a copolymer of vinyl chloride and vinylidine chloride. Other plastics would also be suitable as would brass or malleable iron.

As shown, the diffuser consists of a top portion 16, downwardly flaring side walls 17 and opposite end walls 18 with the lower edges of the end walls being contoured to define arcuate bearing surfaces adapted to rest upon the curved surfaces of the air main 10. The top portion of the trough is suitably apertured to receive, in air tight relationship, a pair of mounting bolt assemblies 19 that threadedly engage the air main to anchor the diffuser in place. Air is supplied from the air main 10 to the diffuser 11 through a plurality of ports 20 provided in the air main for this purpose and the diffuser construction described above forms an impermeable dome that acts as a gas pocket in which the air is confined. The bottom edges of the side walls 17 of the diffuser consists of a plurality of closely spaced downwardly tapering serrations 22 that define a plurality of closely spaced downwardly flaring slots 23. For convenience of manufacture, this open ended slot arrangement is preferred though it will become evident that this is not the only operable arrangement.

The slots define extremely small openings at their upper edges through which the air may be introduced in the form of a continuous and uniform pattern of small bubbles. However, due to their flaring nature, they rapidly increase in size and are inherently capable of handling increased quantities of air by passing it into the liquid in the form of larger bubbles. It should be appreciated that these increased rates of air flow are handled with no increase in friction loss through the diffuser. An advantage of this arrangement resides in the fact that should rags or other bulky debris become entangled with the diffuser, high rates of air flow may be employed for blowing them free. These high air flow rates are also effective to clean the orifices of any materials that may deposit around the edges. Thus, the diffuser of the invention may readily be cleaned without having to remove it from its location within the tank.

A further feature resides in the fact that the air is passed directly from the dome in which it is temporarily stored into the liquid and thus the present diffuser eliminates the tortuous air paths that have been purposely built into prior art diffusers for the purpose of developing small size bubbles. Consequently, the friction loss of the present type diffuser is held to an absolute minimum while the bubble pattern is actually improved.

Another highly important advantage of the serrated type diffuser is the fact that there is little tendency for materials carried in the air stream to collect in the orifices and clog them, but even more important should there be such a collection of material at the upper end of the slots, the air easily passes down and around such collections and thus, in effect, a new orifice replaces the original. The diffuser is shown as being of peaked construction so that the usual tendency of solid materials to settle out and collect on the diffuser is avoided. Due to its peaked shape, the diffuser tends to shed such materials automatically thus preserving the effectiveness of the device.

The size of the entrapped air bubble 25 (Fig. 4) and hence the size and quantity of the bubbles passing through the slots 23 and into the liquid is dependent on the relationship between the pressure and rate of flow in the air supply system, the size of the air pocket formed by the impermeable dome of the diffuser, and the hydrostatic pressure existing in the tank in the region of the diffuser mounting location. Under usual operating conditions it is preferred to limit the bubble sizes and this is accomplished by arranging the system so that the air or gas bubble 25 extends only slightly below the upper ends of the slots 23 as indicated by the line 26. Therefore the size of the orifice is only that portion of the slot 23 that is disposed above the lower extremity 26 of the air bubble 25.

With the form of diffuser shown in Figs. 2, 3, and 4, the diffuser is mounted directly on the air main 10 with the curved end walls 18 seated tightly on the air main and with the serrations at the lower edges of the side walls 17 extending substantially tangent to the air main at their points of contact therewith. It will be noted that the upper edge of the slots 23 is located substantially above the uppermost point on the curved surface of the air main 10 such that the lower extremity of the air pocket, as indicated by the line 26, is safely above the level of the air main. Because of this, air cannot escape underneath the end walls 18 and all of the air passes through the orifices defined by the upper ends of the slots 23. This results in a well regulated and uniform pattern of air bubbles.

In certain aeration applications wherein the air bubbles are emitted into a velocity flow pattern that carries the liquid contents upwardly past the diffuser, there exists an opportunity for the emitted air bubbles to coalesce and produce larger size bubbles which, of course, are less effective. Furthermore, the upwardly converging side walls 17 of the present diffuser may guide the bubbles towards each other and aggravate this problem of coalescing. In such instances it is desirable to form each side wall 17 with a longitudinally extending ridge or rib 27 immediately above the plane defined by the upper ends of the slots 23. This ridge 27 provides the bubbles with convenient spaced breakaway points that overcomes any tendency for the bubbles to cling to and ride upwardly along the side walls 17.

Thus, it may be seen that the objects of the invention have been accomplished in that the diffuser shown herein is well adapted to provide a uniform continuous pattern having a large number of minimum sized bubbles and furthermore, is provided with orifices that are in effect automatically variable in size in accordance with the air flow requirements and that also are non-clogging and self cleaning. All of these features are embodied in a device that introduces a minimum friction loss into the air supply system that is virtually free of any tendency to collect solid particles that may settle out of the liquid being aerated and that is of a simple and inexpensive unitary construction that lends itself to mass production techniques.

It should be understood that the description of the preferred form of the invention is for the purpose of complying with Section 112, Title 35 of the United States Code.

I claim:

1. In a system for introducing a gas into a liquid confined in a treatment chamber, said system including a horizontally extending conduit in the liquid in said chamber adjacent the bottom thereof for supplying gas under pressure, a diffuser, and means forming a gas passage from the conduit to the diffuser, said diffuser having spaced end walls connected by oppositely inclined flat side walls, said side walls converging upwardly to form an impermeable peak-shaped dome for shedding foreign matter, said dome defining a gas pocket for confining gas within said dome under the hydrostatic pressure of said liquid, each of said side walls having a plurality of downwardly flaring coextensive coplanar vertical slots extending completely therethrough, said slots communicating with said pocket at their upper ends and defining orifices for emitting gas to said liquid to produce a vertically rising flow pattern of gas bubbles therein, each of said flat side walls having a rib externally along its length and immediately above the upper ends of the orifice, said end walls terminating at a level below the level of the upper ends of said slots such that the size of the bubbles from said orifices is determined by the pressure and flow rate of said gas, and support means connected between said conduit and diffuser to support said diffuser with the pocket thereof in gas-receiving relation to said conduit, with said conduit and said support means being spaced away from the path of the rising flow pattern of said bubbles.

2. In a system for introducing a gas into a liquid confined in a treatment chamber, said system including a horizontally extending conduit in the liquid in said chamber adjacent the bottom thereof for supplying gas under pressure, a diffuser, and means forming a gas passage from the conduit to the diffuser, said diffuser having side wall structure converging upwardly to form an impermeable peak-shaped dome for shedding foreign matter, said dome defining a gas pocket for confining gas within said dome under the hydrostatic pressure of said liquid, said side wall structure having a plurality of downwardly flaring, coplanar, vertical slots extending completely therethrough, said slots communicating with said pocket at their upper ends and defining orifices for emitting gas to said liquid to produce a vertically rising flow pattern of gas bubbles therein, with the size of the bubbles from said orifices being determined by the pressure and flow rate of said gas, said side wall structure having an external rib extending lengthwise immediately above the upper ends of the orifices, and support means connected between said conduit and diffuser to support said diffuser with the pocket thereof in gas-receiving relation to said conduit, with said conduit and said support means being spaced away from the path of the rising flow pattern of said bubbles.

3. A gas diffuser comprising a body having side wall structure converging upwardly to form an impermeable peak-shaped dome for shedding foreign matter, said dome defining a gas pocket for confining gas within said dome under the hydrostatic pressure of surrounding liquid, said side wall structure having a plurality of downwardly flaring coplanar vertical slots extending completely therethrough, said slots communicating with said pocket at their upper ends and defining orifices for emitting gas to produce a vertically rising flow pattern of gas bubbles, said side wall structure having an external rib extending lengthwise immediately above the upper ends of the orifices.

References Cited in the file of this patent

UNITED STATES PATENTS

| | | |
|---|---|---|
| 308,083 | Maguin | Nov. 18, 1884 |
| 633,066 | Brewer | Sept. 12, 1899 |
| 773,784 | Brunck | Nov. 1, 1904 |
| 1,245,985 | Saunders | Nov. 6, 1917 |
| 1,441,560 | Connors | Jan. 9, 1923 |
| 1,982,226 | Monro | Nov. 27, 1934 |
| 2,064,833 | Howard | Dec. 22, 1936 |
| 2,434,976 | Woodward et al. | Jan. 27, 1948 |

FOREIGN PATENTS

| | | |
|---|---|---|
| 605,046 | Great Britain | July 15, 1948 |
| 742,931 | Great Britain | Jan. 4, 1956 |
| 813,995 | Germany | Sept. 17, 1951 |
| 966,026 | France | Mar. 1, 1950 |